United States Patent
Bar David

(10) Patent No.: US 9,882,873 B2
(45) Date of Patent: Jan. 30, 2018

(54) MAC ADDRESS ALLOCATION FOR VIRTUAL MACHINES

(71) Applicant: Red Hat Israel, Ltd., Ra'anana (IL)

(72) Inventor: Yedidyah Bar David, Tel Aviv (IL)

(73) Assignee: Red Hat Israel, Ltd., Raanana (IL)

(*) Notice: Subject to any disclaimer, the term of this patent is extended or adjusted under 35 U.S.C. 154(b) by 79 days.

(21) Appl. No.: 14/953,387

(22) Filed: Nov. 29, 2015

(65) Prior Publication Data
US 2017/0155620 A1 Jun. 1, 2017

(51) Int. Cl.
*G06F 9/455* (2006.01)
*H04L 29/12* (2006.01)

(52) U.S. Cl.
CPC ...... *H04L 61/6022* (2013.01); *G06F 9/45558* (2013.01); *H04L 61/2015* (2013.01); *G06F 2009/4557* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 7,873,711 B2 | 1/2011 | Adams et al. | |
| 7,984,125 B2 | 7/2011 | Shaw, Jr. et al. | |
| 8,019,837 B2 | 9/2011 | Kannan et al. | |
| 8,429,717 B2 | 4/2013 | He et al. | |
| 8,549,187 B1 | 10/2013 | Christopher et al. | |
| 8,549,517 B2 | 10/2013 | Koma | |
| 8,694,654 B1* | 4/2014 | Kalusivalingam | H04L 41/0806 370/389 |
| 8,966,082 B2 | 2/2015 | Chaturvedi et al. | |
| 9,026,625 B2* | 5/2015 | Christopher | H04L 61/6022 709/220 |
| 2008/0019365 A1* | 1/2008 | Tripathi | H04L 12/4641 370/392 |
| 2008/0089338 A1* | 4/2008 | Campbell | H04L 41/00 370/392 |
| 2009/0327462 A1* | 12/2009 | Adams | G06F 9/5077 709/222 |
| 2010/0138898 A1* | 6/2010 | He | G06F 9/455 726/3 |

OTHER PUBLICATIONS

Howard, John, "Hyper-V: MAC Address Allocation and Apparent Network Issues MAC Collisions Can Cause", Jul. 16, 2008.
Jesin, A., "VMware Bridged Networking", Nov. 13, 2010, Jesin's Blog.
Wikipedia, "MAC address", https://en.wikipedia.org/wiki/MAC_address, retrieved Dec. 1, 2015.

* cited by examiner

*Primary Examiner* — Wissam Rashid
(74) *Attorney, Agent, or Firm* — Lowenstein Sandler LLP

(57) ABSTRACT

Systems and methods for MAC address allocation for virtual machines. An example method may include: initializing a virtual machine, determining that a network identifier has not been assigned to the virtual machine, in view of a determination that a network identifier has not been assigned to the virtual machine, transmitting, via a network, a network identifier request, receiving, via the network, one or more data packets, processing, by a processing device, the one or more data packets to identify a network identifier directed to the virtual machine, and assigning the network identifier to the virtual machine.

20 Claims, 4 Drawing Sheets

MAC ADDRESS ALLOCATION FOR VIRTUAL MACHINES

TECHNICAL FIELD

Implementations of the present disclosure relate to a computing system, and more specifically, to MAC address allocation for virtual machines.

BACKGROUND

Virtualization entails running programs, usually multiple operating systems, concurrently and in isolation from other programs on a single system. Virtualization allows, for example, consolidating multiple physical servers into one physical server running multiple virtual machines in order to improve the hardware utilization rate. Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines.

DESCRIPTION OF DRAWINGS

The details of one or more implementations are set forth in the accompanying drawings and the description below. Other features and advantages will be apparent from the description and drawings, and from the claims.

DETAILED DESCRIPTION

The present disclosure pertains to MAC address allocation for virtual machines.

It can be appreciated that, in certain scenarios, a device connected to a network can be identified based on its unique media access control (MAC) address. While various techniques are utilized to allocated such unique MAC addresses to hardware devices, with respect to virtual machines (which can emulate the operation and properties of hardware devices), corresponding MAC addresses can be dynamically generated (e.g., at the time the virtual machine is initialized). Due to the dynamic nature of virtual machines, problems can arise when two (or more) virtual machines having the same MAC address attempt to run within the same network environment (creating conflicts with respect to a single MAC address).

Accordingly, described herein are various technologies that enable MAC address allocation for virtual machines. The described technologies can enable the centralized assignment of MAC addresses to virtual machines in a manner that ensures that multiple virtual machines do not share the same MAC address. In certain implementations, upon initializing a virtual machine (that has not been assigned a MAC address), the virtual machine can broadcast (via a network) a request for a MAC address. Such a request can then be received by a central MAC address allocation server which can generate/allocate a MAC address to the virtual machine. The server can then broadcast the MAC address (and related identifying information associated with the virtual machine) via the network. Concurrently, the virtual machine can listen to transmissions provided on a network in order to identify a response to the MAC address request. Upon identifying a response directed to the virtual machine, the allocated MAC address can be assigned to the virtual machine. In doing so, multiple virtual machines can be initialized within the same network environment without the risk of such virtual machines being assigned conflicting MAC addresses.

In the following description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

For brevity, simplicity and by way of example, a hypervisor performs many of the operations described herein. It is contemplated that other actors may perform some or all of the operations described herein, including a host operating system, multiple hypervisors, a VM MAC address manager, and the like, including a combination thereof.

Figure 1:
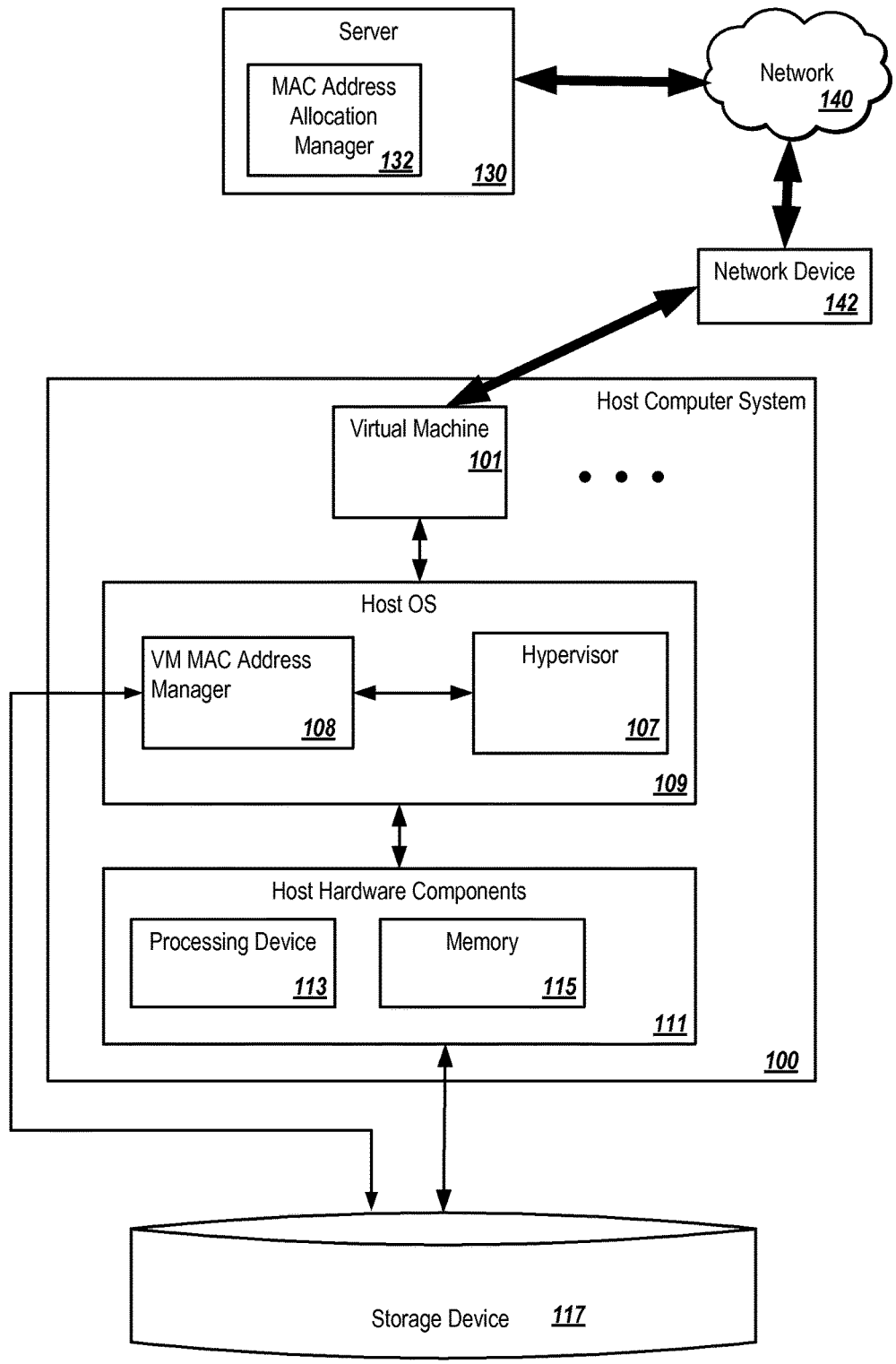
FIG. 1 is a block diagram of a host computer system in accordance with some implementations.

FIG. 1 is a block diagram that illustrates an example of a host computer system 100 that hosts one or more VMs, such as VM 101. Each VM can run a guest operating system (OS). The VMs may have the same or different guest operating systems, such as Microsoft Windows®, Linux®, Solaris®, Mac® OS, etc. The host computer system 100 may be a server, a workstation, a personal computer (PC), a mobile phone, a palm-sized computing device, a personal digital assistant (PDA), etc.

The host computer system 100 runs a hypervisor 107 to virtualize access to the underlying host hardware, making the use of the VM transparent to the guest OS and a user of the host computer system 100. The hypervisor 107 may also be known as a virtual machine monitor (VMM) or a kernel-based hypervisor. The hypervisor 107 may be part of a host OS 109 (as shown in FIG. 1), run on top of the host OS 109, or run directly on the host hardware without an operating system beneath it (i.e., bare metal). The host OS 109 can be the same OS as the guest OS, or can be a different OS.

In certain implementations, the hypervisor 107 can include a virtual machine (VM) media access control (MAC) address manager 108 that handles various operations associated with obtaining a MAC address for virtual machine 101. In other implementations, VM MAC address manager 108 can execute/operate outside/independent of hypervisor 107 (e.g., as shown in FIG. 1), and may be configured to communicate with hypervisor 107, e.g., in order to provide information pertaining to certain operations (such as those described herein) to the hypervisor. Some implementations of VM MAC address manager 108 will be discussed in more detail below in conjunction with FIG. 2.

The host computer system 100 includes hardware components 111 such as one or more physical processing devices (e.g., central processing units (CPUs)) 113, memory 115 (also referred to as "host memory" or "physical memory") and other hardware components. In one implementation, the host computer system 100 includes one or more physical devices (not shown), which can be audio/video devices (e.g., video cards, sounds cards), network interface devices, printers, graphics modules, graphics devices, system components (e.g., PCI devices, bridges, ports, buses), etc. It is understood that the host computer system 100 may include any number of devices.

The host computer system 100 may also be coupled to one or more storage devices 117 via a direct connection or a network. The storage device 117 may be an internal storage device or an external storage device. Examples of storage devices include hard disk drives, optical drives, tape drives, solid state drives, and so forth. Storage devices may be accessible over a local area network (LAN), a wide area network (WAN) and/or a public network such as the internet. Examples of network storage devices include network attached storage (NAS), storage area networks (SAN), cloud storage (e.g., storage as a service (SaaS)), and so forth.

In certain scenarios (such as are described herein), host computer system 100 and/or virtual machine 101 can communicate with server 130, such as via network 140. Server 130 can be, for example, a server, a workstation, a personal computer (PC), a mobile phone, a palm-sized computing device, a personal digital assistant (PDA), etc., that is configured (e.g., by/in conjunction with MAC address allocation manager 132) to receive requests for network identifiers and to allocate/assign identifiers in response to such requests. For example, as described herein, server 130 and/or MAC address allocation manager 132 can receive, via the network, a request for a MAC address from a virtual machine (which has not been assigned a MAC address) and can generate and/or allocate such a MAC address with respect to the virtual machine and then transmit/broadcast the MAC address via the network in a manner that is perceptible to the virtual machine (e.g., using one or more other identifiers that have been assigned to the virtual machine, such as is described herein).

Moreover, in certain implementations (such as is depicted in FIG. 1) host computer system 100 and/or virtual machine 101 can connect to network 140 and/or can communicate with server 130, via network device 142. Network device 142 can be a device such as a router, switch, etc., which can connect various computer devices and/or networks to one another, route network traffic, etc. Additionally, as described herein, network device 142 can be configured to forward packets and/or other information to/from various machines and/or devices, such as those described herein.

Figure 2:
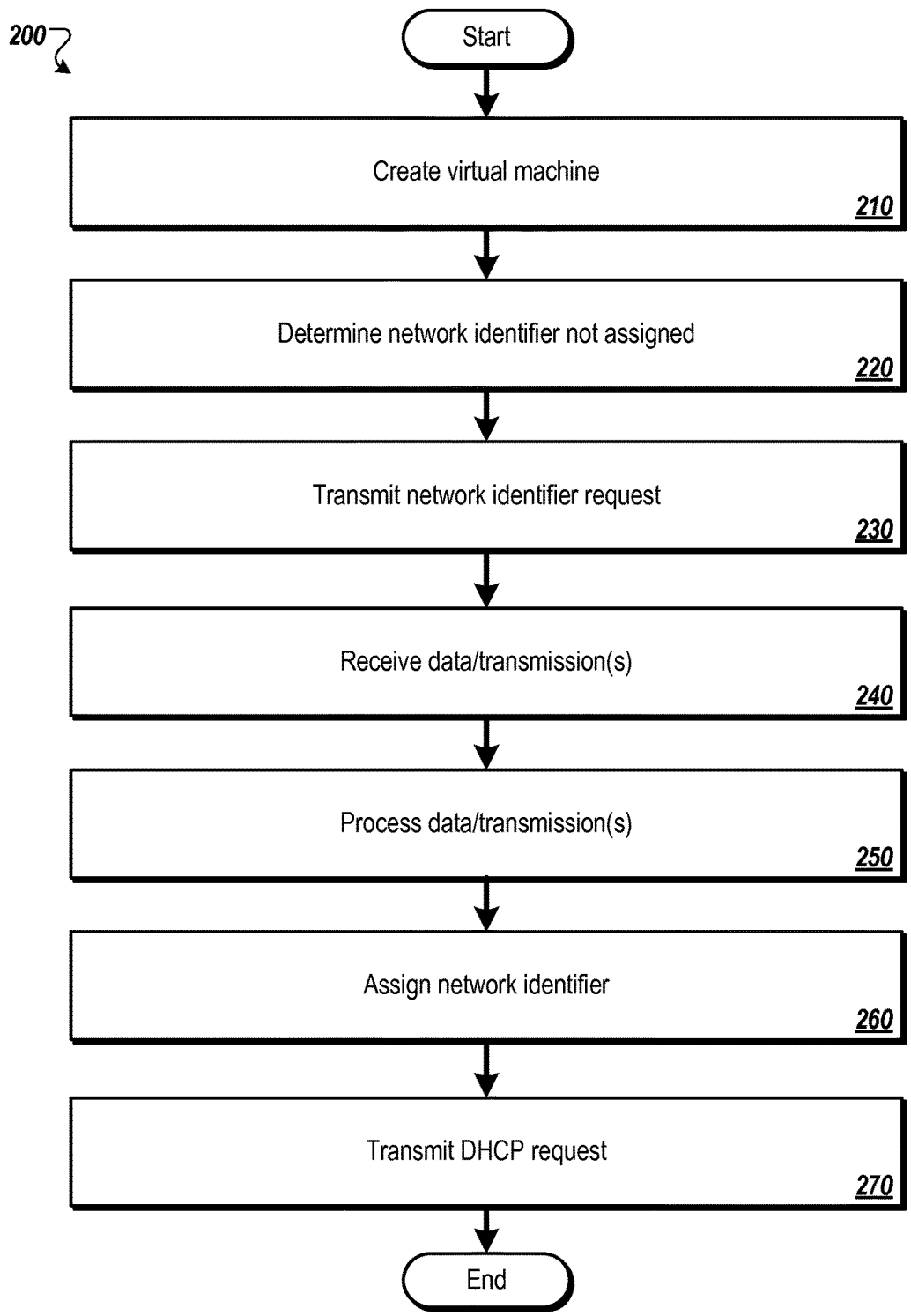
FIG. 2 is a flow diagram of a method for MAC address allocation for virtual machines in accordance with some implementations.

FIG. 2 is a flow diagram of a method 200 for MAC address allocation for virtual machines in accordance with some implementations. Method 200 can be performed by processing logic (e.g., in computing system 400 of FIG. 4) that may comprise hardware (e.g., circuitry, dedicated logic, programmable logic, microcode, etc.), software (such as instructions run on a processing device), firmware, or a combination thereof. In one implementation, method 200 is performed by virtual machine 101 (e.g., by a DHCP client executing in conjunction with the virtual machine), hypervisor 107 and/or VM MAC address manager 108 of FIG. 1. For clarity of presentation, the description that follows uses the system 100 as examples for describing the method 200. However, another system, or combination of systems, may be used to perform the method 200.

At block 210, a virtual machine can be initialized and/or created, such as by hypervisor 107.

At block 220, it can be determined that a network identifier has not been assigned to a virtual machine (e.g., the virtual machine initialized/created at block 210). In certain implementations, the referenced network identifier can be a media access control (MAC) address. Additionally, in certain implementations such a determination can be made by virtual machine 101, VM MAC address manager 108 and/or hypervisor 107. For example, one or more parameters associated with virtual machine 101 can be analyzed to determine whether a MAC address has been assigned to the virtual machine. In certain implementations, such parameters may reflect no data/an undefined value associated with the MAC address of the virtual machine, while in other implementations a MAC address of all zeros ('0') may reflect that a MAC address has yet to be assigned.

At block 230, a network identifier request can be transmitted. In certain implementations, such a network identifier request can be transmitted by virtual machine 101, VM MAC address manager 108 and/or hypervisor 107. Moreover, in certain implementations the referenced network identifier request can be transmitted via a network. Additionally, in certain implementations, the referenced network identifier request can be transmitted based on, in view of, and/or in response to a determination that a network identifier has not been assigned to the virtual machine. For example, having determined (e.g., at block 230) that a virtual machine does not have a MAC address assigned, the virtual machine can transmit, via a network, a request for a MAC address. It should be understood that the referenced request can include a universal identifier associated with the virtual machine (e.g., a universally unique identifier (UUID)), and/or a network controller identifier associated with the virtual machine (e.g., a network interface controller (NIC) identifier) (one or both of which may be assigned to the virtual machine, even in a scenario in which a MAC address has not been assigned). It should also be noted that, in certain implementations, the referenced network identifier request can be configured to conform to various protocols. For example, in certain implementations, the network identifier request can be DHCPDISCOVER packet/message. In other implementations, various aspects of the DHCP protocol can be modified and/or expanded, such as in order to further encompass the referenced network identifier request and/or various other functionality, such as is described herein. Additionally, it should be noted that, in certain implementations, network device 142 (e.g., a router, switch, etc.) can be configured to forward packet(s) it receives (e.g., the referenced network identifier request and/or or other communications received from and/or directed to virtual machine 101) even in scenarios in which such communications do not include a MAC address (such as is described herein). For example, in certain implementations the referenced packet(s) received by network device 142 can include and/or otherwise incorporate (e.g., as a header) a network identifier (e.g., a UUID and/or a NIC ID) associated with the virtual machine with respect to which the packet(s) are directed.

At block 240, one or more data packets can be received. In certain implementations such data packets can be received via the network. For example, having transmitted a network identifier request (e.g., at block 230), virtual machine 101, VM MAC address manager 108 and/or hypervisor 107 can 'listen' to data packets and/or any other such transmissions that are provided over the network. In doing so, those transmission(s) that are directed to the virtual machine (e.g., in response to the request), can be identified (e.g., based on an identification of packet(s) received from network device 142 that include and/or otherwise incorporate (e.g., as a header) a network identifier, such as a UUID and/or a NIC ID, associated with the virtual machine with respect to which the packet(s) are directed) such as is described herein.

At block 250, one or more data packets (such as the data packets/transmissions received at block 240) can be processed (e.g., by virtual machine 101, VM MAC address manager 108 and/or hypervisor 107). In doing so, a network identifier (e.g., a MAC address) directed to a virtual machine (such as the virtual machine initialized/created at block 210) can be identified. It should be understood that, in certain implementations, such a network identifier that is directed to the virtual machine can be generated based on/in response to a network identifier request (e.g., as transmitted at block 230) which, as noted, can include, a UUID and/or a NIC ID associated with the virtual machine. Moreover, in addition to the MAC address itself, the referenced data packets/transmissions can include or otherwise incorporate the UUID and/or NIC ID associated with the virtual machine (such as are provided in the network identifier request). Based on the incorporated the UUID and/or NIC ID, virtual machine 101, VM MAC address manager 108 and/or hypervisor 107 can identify, while listening, the data packet(s)/transmission(s) that are directed to the virtual machine. It should be understood that, in certain implementations, such a network identifier that is directed to the virtual machine can be generated by server 130 and/or MAC address allocation manager 132, such as in a manner described herein.

At block 260, a network identifier (such as the network identifier identified at block 250) can be assigned to a virtual machine (such as the virtual machine initialized/created at block 210). In certain implementations such an assignment can be made by virtual machine 101, VM MAC address manager 108 and/or hypervisor 107.

At block 270, a Dynamic Host Configuration Protocol (DHCP) request can be transmitted. In certain implementations, the referenced DHCP request can be transmitted based on, in view of, and/or in response to an assignment of a network identifier to a virtual machine (e.g., at block 260). In doing so, having been assigned a MAC address, the virtual machine can request (and subsequently be assigned) an Internet Protocol (IP) address. Additionally, in certain implementations such a transmission can be made by virtual machine 101, VM MAC address manager 108 and/or hypervisor 107.

Figure 3:
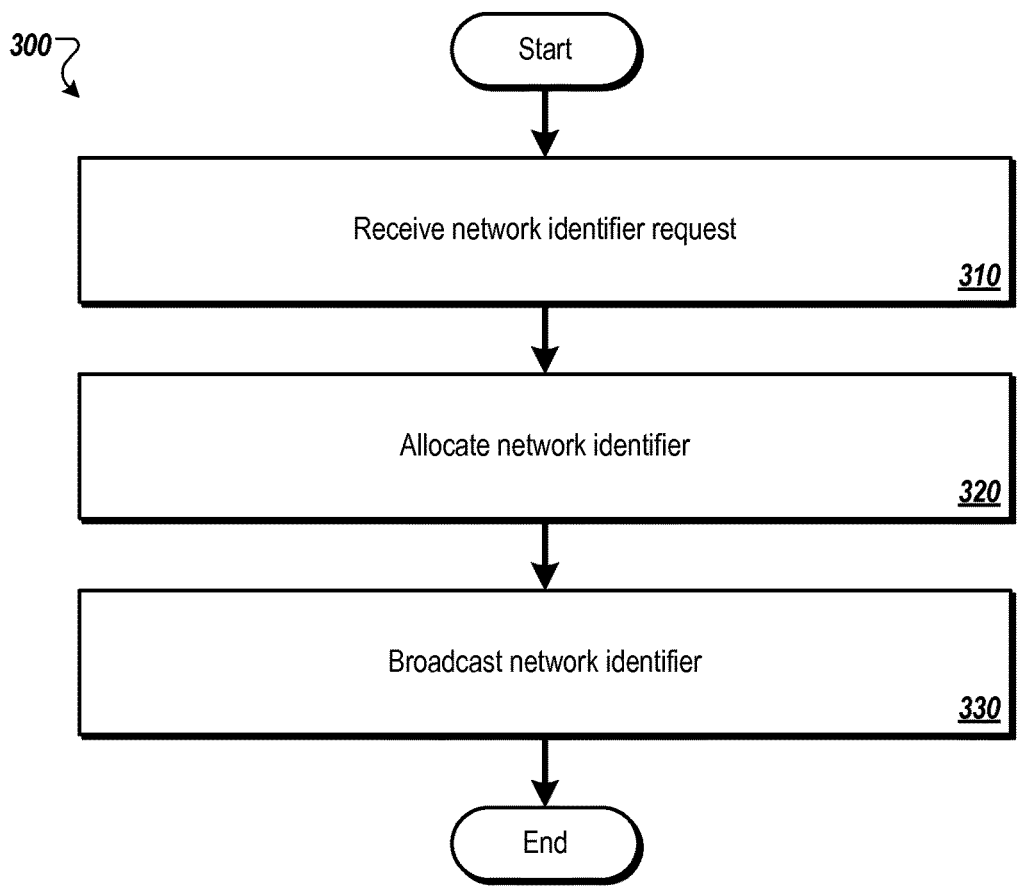
FIG. 3 is a flow diagram of a method for MAC address allocation for virtual machines in accordance with some implementations.

FIG. 3 is a flow diagram of a method 300 for MAC address allocation for virtual machines in accordance with some implementations. Method 300 can be performed by processing logic (e.g., in computing system 400 of FIG. 4) that may comprise hardware (e.g., circuitry, dedicated logic, programmable logic, microcode, etc.), software (such as instructions run on a processing device), firmware, or a combination thereof. In one implementation, method 300 is performed by server 130 and/or MAC address allocation manager 132 of FIG. 1. For clarity of presentation, the description that follows uses the system 130 as examples for describing the method 300. However, another system, or combination of systems, may be used to perform the method 300.

At block 310, a network identifier request (e.g., a request for a MAC address) can be received (e.g., by server 130 and/or MAC address allocation manager 132). In certain implementations, such a network identifier request can be received from a virtual machine, such as a virtual machine with respect to which a media access control (MAC) address has not been allocated. Moreover, in certain implementations such a network identifier request can include a UUID and/or a NIC ID associated with the virtual machine.

At block 320, a network identifier (e.g., a MAC address) can be allocated (e.g., by server 130 and/or MAC address allocation manager 132). In certain implementations, such a network identifier can be allocated with respect to a virtual machine. Moreover, in certain implementations, such a network identifier can be allocated in response to a network identifier request (e.g., the network identifier request received at block 310). Additionally, in certain implementations, the referenced network identifier can be allocated for a defined time period (upon expiration of which, for example, the same network identifier may be allocated in response to another request).

At block 330, a network identifier (such as the network identifier allocated at block 320) can be broadcast (e.g., by server 130 and/or MAC address allocation manager 132), e.g., via a network. In certain implementations, such a network identifier can be broadcast in conjunction with one or more other identifiers associated with a virtual machine (e.g., the virtual machine to which the network identifier is directed). For example, in certain implementations such a network identifier can be broadcast in conjunction with a UUID and/or a NIC ID associated with the virtual machine. For example, in certain implementations the referenced packet(s) received by network device 142 can include and/or otherwise incorporate (e.g., as a header) a network identifier (e.g., a UUID and/or a NIC ID) associated with the virtual machine with respect to which the packet(s) are directed. As a result, the virtual machine to which the network identifier (e.g., MAC address) is directed can 'listen to' transmissions being broadcast across the network and can identify the network identifier being directed to it.

It should be understood that while the forgoing description has provided various illustrations of the referenced MAC address allocation technologies with respect to one or more virtual machines, such technologies can also or alternatively be employed in relation to one or more other elements, components, and/or devices.

Figure 4:
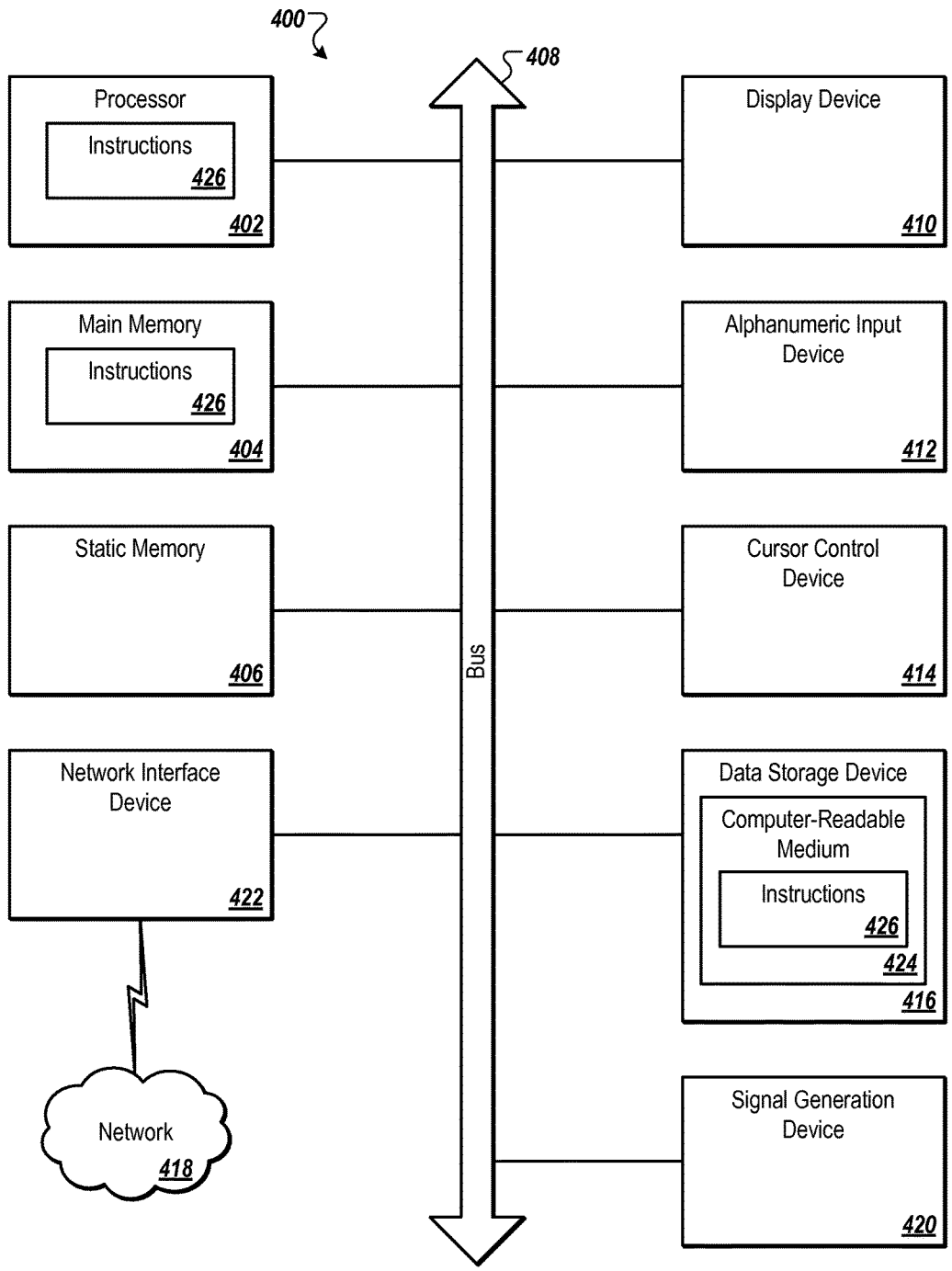
FIG. 4 is a schematic diagram that shows an example of a machine in the form of a computer system.

FIG. 4 is a schematic diagram that shows an example of a machine in the form of a computer system 400. The computer system 400 executes one or more sets of instructions 426 that cause the machine to perform any one or more of the methodologies discussed herein. The machine may operate in the capacity of a server or a client machine in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions 426 to perform any one or more of the methodologies discussed herein.

The computer system 400 includes a processor 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 416, which communicate with each other via a bus 408.

The processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions of the host computer system 100 for performing the operations and steps discussed herein.

The computer system 400 may further include a network interface device 422 that provides communication with other machines over a network 418, such as a local area network (LAN), an intranet, an extranet, or the Internet. The computer system 400 also may include a display device 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a computer-readable storage medium 424 on which is stored the sets of instructions 426 of the host computer system 100 embodying any one or more of the methodologies or functions described herein. The sets of instructions 426 of the host computer system 100 may also reside, completely or at least partially, within the main memory 404 and/or within the processor 402 during execution thereof by the computer system 400, the main memory 404 and the processor 402 also constituting computer-readable storage media. The sets of instructions 426 may further be transmitted or received over the network 418 via the network interface device 422.

While the example of the computer-readable storage medium 424 is shown as a single medium, the term "computer-readable storage medium" can include a single medium or multiple media (e.g., a centralized or distributed database, and/or associated caches and servers) that store the sets of instructions 426. The term "computer-readable storage medium" can include any medium that is capable of storing, encoding or carrying a set of instructions for execution by the machine and that cause the machine to perform any one or more of the methodologies of the present disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, it is appreciated that throughout the description, discussions utilizing terms such as "initializing," "determining," "receiving", "allocating", "broadcasting", "enabling", or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same implementation unless described as such.

It is to be understood that the above description is intended to be illustrative, and not restrictive. Other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   initializing, by a processing device, a virtual machine;
   determining, by the processing device via the virtual machine, that a first network identifier has not been assigned to the virtual machine;
   in view of determining that the first network identifier has not been assigned to the virtual machine, transmitting, by the processing device via the virtual machine, a network identifier request to a server;

in response to transmitting the network identifier request, receiving one or more data packets at the virtual machine;

processing, by the processing device, the one or more data packets to identify a second network identifier directed to the virtual machine; and assigning the second network identifier to the virtual machine.

2. The method of claim 1, wherein the network identifier request comprises a universal identifier associated with the virtual machine.

3. The method of claim 2, wherein the universal identifier comprises a universally unique identifier (UUID).

4. The method of claim 1, wherein the network identifier request comprises a network controller identifier associated with the virtual machine.

5. The method of claim 4, wherein the network controller identifier comprises a network interface controller (NIC) identifier.

6. The method of claim 1, wherein receiving one or more data packets comprises listening to one or more transmissions provided over the network.

7. The method of claim 6, wherein processing the one or more data packets comprises processing the one or more transmissions to identify the second network identifier directed to the virtual machine.

8. The method of claim 1, further comprising transmitting a Dynamic Host Configuration Protocol (DHCP) request in view of the second network identifier as assigned to the virtual machine.

9. The method of claim 1, wherein the network identifier comprises a media access control (MAC) address.

10. A system comprising:
a memory; and
a processing device, operatively coupled to the memory, to:
  initialize a virtual machine;
  determine, by the processing device via the virtual machine, that a first network identifier has not been assigned to the virtual machine;
  in view of determining that the first network identifier has not been assigned to the virtual machine, transmit, by the processing device via the virtual machine, a network identifier request;
  in response to transmitting the network identifier request, receive, one or more data packets at the virtual machine;
  process the one or more data packets to identify a second network identifier directed to the virtual machine; and
  assign the second network identifier to the virtual machine.

11. The system of claim 10, wherein the network identifier request comprises a universal identifier associated with the virtual machine.

12. The system of claim 10, wherein the network identifier request comprises a network controller identifier associated with the virtual machine.

13. The system of claim 10, wherein receiving one or more data packets comprises listening to one or more transmissions provided over the network.

14. The system of claim 13, wherein processing the one or more data packets comprises processing the one or more transmissions to identify the second network identifier directed to the virtual machine.

15. The system of claim 10, further comprising transmitting a Dynamic Host Configuration Protocol (DHCP) request in view of the second network identifier as assigned to the virtual machine.

16. A non-transitory computer-readable storage medium having instructions that, when executed by a processing device, cause the processing device to:
  in response to a virtual machine determining that a first network identifier has not been assigned to the virtual machine, receive a network identifier request from the virtual machine;
  in response to receiving the network identifier request, allocate, by the processing device, a second network identifier with respect to the virtual machine; and
  broadcast, via the network, the second network identifier, as allocated, in conjunction with one or more other identifiers associated with the virtual machine.

17. The non-transitory computer-readable storage medium of claim 16, wherein to allocate the second network identifier to the virtual machine the processing device is further to allocate the second network identifier to the virtual machine for a defined time period.

18. The non-transitory computer-readable storage medium of claim 16, wherein the network identifier request comprises a universally unique identifier (UUID) associated with the virtual machine.

19. The non-transitory computer-readable storage medium of claim 16, wherein the network identifier request comprises a network interface controller (NIC) identifier associated with the virtual machine.

20. The non-transitory computer-readable storage medium of claim 16, wherein to transmit the second network identifier the processing device is further to transmit, via the network, the second network identifier, in conjunction with a universally unique identifier (UUID) associated with the virtual machine.

* * * * *